(12) United States Patent
Calman et al.

(10) Patent No.: US 9,374,430 B2
(45) Date of Patent: Jun. 21, 2016

(54) SOCIAL BADGING FOR ELECTRONIFICATION OF PAPER

(71) Applicant: Bank of America Corporation, Charlotte, NC (US)

(72) Inventors: Matthew A. Calman, Charlotte, NC (US); Betzy Bosley Hepburn, Wilmington, DE (US); Abby Elyse Smith, Pebble Beach, CA (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 281 days.

(21) Appl. No.: 13/866,256

(22) Filed: Apr. 19, 2013

(65) Prior Publication Data

US 2014/0317182 A1 Oct. 23, 2014

(51) Int. Cl.
*G06F 15/16* (2006.01)
*H04L 29/08* (2006.01)
*G06Q 10/10* (2012.01)
*G06Q 50/00* (2012.01)

(52) U.S. Cl.
CPC .............. *H04L 67/22* (2013.01); *G06Q 10/10* (2013.01); *G06Q 50/01* (2013.01)

(58) Field of Classification Search
CPC ...................................................... H04L 67/22
USPC .......................................................... 709/204
See application file for complete search history.

(56) References Cited

U.S. PATENT DOCUMENTS

| 7,061,391 | B2 | 6/2006 | Hopper et al. |
| 7,541,941 | B2 | 6/2009 | Bogolea et al. |
| 8,010,659 | B2 | 8/2011 | Haenel et al. |
| 8,086,354 | B2 | 12/2011 | Bondar et al. |
| 8,285,574 | B2 | 10/2012 | Boss et al. |
| 8,356,302 | B1 | 1/2013 | Calman |
| 2009/0313632 | A1 | 12/2009 | Haenel et al. |
| 2010/0049536 | A1* | 2/2010 | Quine et al. ...................... 705/1 |
| 2010/0106575 | A1 | 4/2010 | Bixby et al. |
| 2010/0191596 | A1* | 7/2010 | Goldman ................... 705/14.36 |
| 2010/0217550 | A1* | 8/2010 | Crabtree et al. ................. 702/62 |
| 2010/0217642 | A1* | 8/2010 | Crubtree et al. ................... 705/8 |
| 2010/0217651 | A1* | 8/2010 | Crabtree et al. ................ 705/10 |
| 2010/0218108 | A1* | 8/2010 | Crabtree et al. ............... 715/738 |
| 2010/0332373 | A1* | 12/2010 | Crabtree et al. ................ 705/37 |
| 2011/0015981 | A1* | 1/2011 | Subramanian ............. 705/14.23 |
| 2011/0040666 | A1* | 2/2011 | Crabtree et al. ................ 705/37 |
| 2011/0082733 | A1* | 4/2011 | Goldman ................... 705/14.17 |
| 2011/0191239 | A1* | 8/2011 | Blackhurst et al. ............. 705/39 |
| 2012/0209783 | A1* | 8/2012 | Smith et al. ................... 705/308 |
| 2015/0094968 | A1* | 4/2015 | Jia et al. ....................... 702/60 |
| 2015/0371227 | A1* | 12/2015 | Foulds .................. H04W 12/06 705/44 |

* cited by examiner

*Primary Examiner* — Douglas Blair
(74) *Attorney, Agent, or Firm* — Michael A. Springs; Moore & Van Allen PLLC; Anup Shrinivasan (57) ABSTRACT

Embodiments of the invention are directed to systems, methods and computer program products for social badging. An exemplary apparatus is configured to: receive information associated with a user's interaction with an entity; determine or receive a rating based on the interaction, wherein the rating indicates an environmental impact of the interaction; and broadcast the rating on a social network.

19 Claims, 4 Drawing Sheets

SOCIAL BADGING FOR ELECTRONIFICATION OF PAPER

BACKGROUND

There is a need for a trusted platform for aggregating and analyzing consumption data, emission data, or other carbon credit-type data.

BRIEF SUMMARY

In some embodiments, an apparatus is provided for social badging. The apparatus comprises a memory; a processor; and a module stored in the memory, executable by the processor, and configured to: receive information associated with a user's interaction with an entity; determine a rating based on the interaction, wherein the rating indicates an environmental impact of the interaction; and broadcast the rating on a social network. As used herein, a rating may refer to a score, a number of credits (or debits), a credit (or debit) amount, or the like.

In some embodiments, the interaction comprises a purchase transaction.

In some embodiments, the interaction comprises an action or an inaction.

In some embodiments, the interaction comprises at least one of a consumption or an emission.

In some embodiments, the interaction comprises selecting an option to switch from paper-based notification to electronic notification.

In some embodiments, the information associated with the user's interaction is received immediately after the interaction occurs or is received based on a predetermined schedule.

In some embodiments, the information is received from the entity, and wherein the entity obtains permission from the user to transmit the information.

In some embodiments, the information is received from the user.

In some embodiments, the rating comprises either a positive rating or a negative rating.

In some embodiments, the module is configured to receive a formula based on which the rating is determined.

In some embodiments, the rating is broadcasted to the user's connections on the social network.

In some embodiments, the module is further configured to determine, based on the user's rating, a rating for a group on the social network.

In some embodiments, the module is further configured to enable the user to determine a group to which the user's rating is pledged.

In some embodiments, the module is configured to update progress towards a user-defined goal based on the rating, wherein a representation of the progress is broadcasted on the social network.

In some embodiments, the information is pulled from a transaction history associated with the user.

In some embodiments, the entity comprises a financial institution.

In some embodiments, the module enables a comparison of ratings associated with multiple users or groups on the social network.

In some embodiments, the rating comprises a carbon credit score.

In some embodiments, the module enables the user create a campaign to achieve a particular rating in a particular period.

In some embodiments, a method is provided for social badging. The method comprises: receiving information associated with a user's interaction with an entity; determining a rating based on the interaction, wherein the rating indicates an environmental impact of the interaction; and broadcasting the rating on a social network.

In some embodiments, a computer program product is provided for social badging. The computer program product comprises a non-transitory computer-readable medium comprising a set of codes for causing a computer to: receive information associated with a user's interaction with an entity; determine a rating based on the interaction, wherein the rating indicates an environmental impact of the interaction; and broadcast the rating on a social network.

BRIEF DESCRIPTION OF THE DRAWINGS

Having thus described embodiments of the invention in general terms, reference will now be made to the accompanying drawings, where:

DETAILED DESCRIPTION OF EMBODIMENTS OF THE INVENTION

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

Embodiments of the invention are directed to systems, methods and computer program products for social badging. As used herein, social badging refers to the process of determining carbon credit-type data (e.g., consumption data, emission data, or the like) associated with a user and sharing/publishing carbon credit-type data associated with the user. The invention enables a social network to receive carbon credit-type data associated with a user from an entity that interacted with a user. As described herein, an interaction between the user and an entity may comprise an action performed by the user or an action not performed by the user (i.e., an inaction). The interaction may be communicated to the social network immediately after (e.g., in real-time) the interaction occurs or based on a predetermined schedule (e.g., daily, weekly, or the like). In some embodiments, the interaction may be communicated by the user to the social network; however, the social network may subsequently contact the entity associated with the interaction to verify the occurrence (and/or details) of the interaction. In other embodiments, the user's self-reported interactions may not be verified. As used, an interaction and an action may be used interchangeably.

A user may perform an action or an inaction that leads to the consumption of a consumable or an emission of a greenhouse gas. As used herein, a carbon credit is a generic term that represents a right to emit a predetermined amount of: gas (e.g., greenhouse gas such as carbon dioxide), and/or liquid, and/or solid (e.g., particulate matter). Alternatively, a carbon credit (or just a credit) may refer to the right to consume a predetermined amount of a consumable. The credit may represent a form of currency. The consumption of a consumable may or may not lead to the emission of a gas, a liquid, or a solid as described herein. In some embodiments, consumption as described herein may comprise both consumption and emission. In some embodiments, emission as described herein may comprise both emission and consumption. An action as described herein may refer to a purchase or non-purchase. Examples of actions include commuting by a bus, rather than a car, to work, buying a car with a superior carbon footprint, signing up for electronic statements, asking for groceries to be placed in paper bags as opposed to plastic bags, receiving an electronic receipt rather than a paper receipt after making a purchase at a store, or the like.

As described herein, the entity may prompt a user to grant permission to the entity to report the user's action (and/or other information associated with the user's action such as the credits) to the social network either prior to, during, or after the action is completed. Therefore, either prior to, during, or after the action is completed, the user shares the user's social network identification information with the entity. Either prior to, during, or after the user's action (i.e., interaction with the entity) is completed, the entity transmits details associated with the user's interaction to the social network along with the user's social network identification information. The social network then uses the user's social network identification information to broadcast a rating (e.g., a credit amount) associated with the user's interaction, and optionally broadcasts details associated with the user's action based on whether the user chooses to broadcast such information.

As an example, a user who has an account at a financial institution may select an option on the user's account to switch from paper-based statements (or paper-based notification) to electronic statements (or electronic notification). The user may provide permission for the entity to communicate information associated with the user's action to the social network. For example, the information may comprises a credit amount (e.g., a carbon credit amount) associated with the user's action. In some embodiments, the entity predetermines a credit amount associated with a particular action. For example, the entity has a database that lists actions and credit amounts associated with each action. In other embodiments, the entity dynamically determines a credit amount associated with a particular action either while the action is being completed or immediately after completion of the action. The credit amount may be based on at least one of the type of activity, the duration of the activity, the environmental impact of the activity, or the like. In still other embodiments, the information associated with the user's action is communicated to the social network and the social network determines a credit amount associated with a particular action.

The credit amount may be broadcasted on the social network to the user's connections (e.g., to the user's friends, family, user-selected groups, demographic group, geographic group, or the like). The user may determine which connections or groups to which the credit amount is broadcasted. Additionally, the credit amount may be used in determining a credit amount (e.g., for a particular period) for the group. For example, the user's credit amount (2 credits) may be added to the credit amount for a group (e.g., the user's geographical group). Additionally, in some embodiments, the social network may ensure that only a single group gets the benefit of the user's credit amount. Therefore, the social network may ensure that the user's geographical group (e.g., City X) gets the credit amount but the user's employer group (e.g., Employer X) does not get the credit amount. In some embodiments, the user decides which group gets the user's credit. Therefore, the user may pledge the user's credits to a particular group to support a particular campaign associated with the particular group. The campaign may be a goal to earn a certain number of credits in a defined period. The user may or may not change which group gets the user's credit after the credit has been assigned to a particular group. In some embodiments, multiple groups may get the benefit of the user's credit amount. Therefore, in such embodiments, the user's geographical group and employer group may both the get the benefit of the credit amount. The present invention enables segmentation of a population based on the credits earned by each group in a population. Therefore, the information associated with credits of various groups may be used to determine which groups are more environmentally sensitive. As used herein, a group may refer to a collection of users on the social network, wherein the users in the group are invited to join the group (or voluntarily join the group) based on common characteristics or interests.

A user may pre-register the user's social network identification information with an entity that reports information associated with the user's interaction with the entity. Therefore, the entity transmits (e.g., via an application programming interface) to the social network the social network identification information associated with the user, the nature of the interaction between the entity and the user (along with other details of the interaction such as duration of interaction), and, optionally, the credit amount based on the interaction. Additionally, the entity may transmit to the social network the basis or formula based on which the credit amount was computed. In some embodiments, the social network evaluates the basis or formula on which the credit amount is computed and determines whether to retain the entity's basis or formula or to apply the social network's own basis or formula to the user's interaction. Therefore, in other embodiments, the social network receives details of the interaction between the entity and the user and the social network itself determines the credit amount associated with the user's action.

The social network may allow a user or a group to define a goal. The goal may be part of a campaign. Users in the group may be encouraged to participate in the campaign and earn credits to achieve the goal. Any users that do not earn a predetermined credit amount by a predetermined deadline may be removed from the group. The goal may be to achieve a certain credit amount (or number of credits) in a certain period. The goal may be published on the user's social network page if the user chooses to make the goal available to the user's connections on the social network and/or the user's groups. When the information described herein is communicated from the entity to the social network, the social network may update the progress towards the goal. The progress may be updated immediately after the information is communicated to the social network or may be updated on a periodic basis (e.g., daily, weekly, or the like). The goal and the progress towards the goal may be represented by text or by images. In some embodiments, an entity or a social network may provide a reward to the user or the group if the goal is met.

In some embodiments, a user may initiate a campaign (or create a group) and encourage the user's connections to participate in the user's campaign. As an example, a user may set a condition that the user's connections need to go paperless (e.g., switch from paper based notification to electronic notification) on their financial institution accounts in order to join the user's campaign. In some embodiments, the financial institution may set a goal to earn a certain number of credits as well in a predefined period of time. In order to achieve this goal, the financial institution may encourage users to switch from paper-based notification to electronic notification (e.g., a note may be presented on each user's transaction history page to encourage the user to earn credits by going paperless). As used herein, a financial institution may refer to any entity, including an entity that may not be a financial institution. In some embodiments, a user may receive additional credits when the user's connections join the user's campaign and contribute credits towards the user's campaign. In some embodiments, a user may trade (send and/or receive) the user's credits with the user's connections on the social network.

In some embodiments, instead of a credit amount, a debit amount may alternatively be reported by the entity if the user's action incurs a debit (e.g., harm to the environment) rather than a credit. Alternatively, in embodiments where the social network determines whether the user incurs a debit or a credit, the debit amount is determined by the social network based on information received from the entity. As used herein, any features of the invention with respect to credit amounts are also applicable to debit amounts. Therefore, any processes that are used to compute credit amounts may also be used to compute debit amounts. As an example, if a user purchases a new car that has an inferior carbon footprint compared to the user's previous car, this action may result in a debit amount. As another example, if a user reverts to paper statements from electronic statements, this action may result in a debit amount.

In some embodiments, a financial institution may analyze the user's transaction history and compute a credit amount. The transaction history may be associated with transactions executed by the user during a predetermined period. The transactions may be executed across multiple accounts, e.g., credit accounts, debit accounts, gift card accounts, prepaid card accounts, or the like. If the user has previously granted permission to the financial institution associated with the user's account, the financial institution may communicate information (e.g., actions or inactions) associated with the user's transactions and a credit amount associated with the information to the social network.

Figure 1:
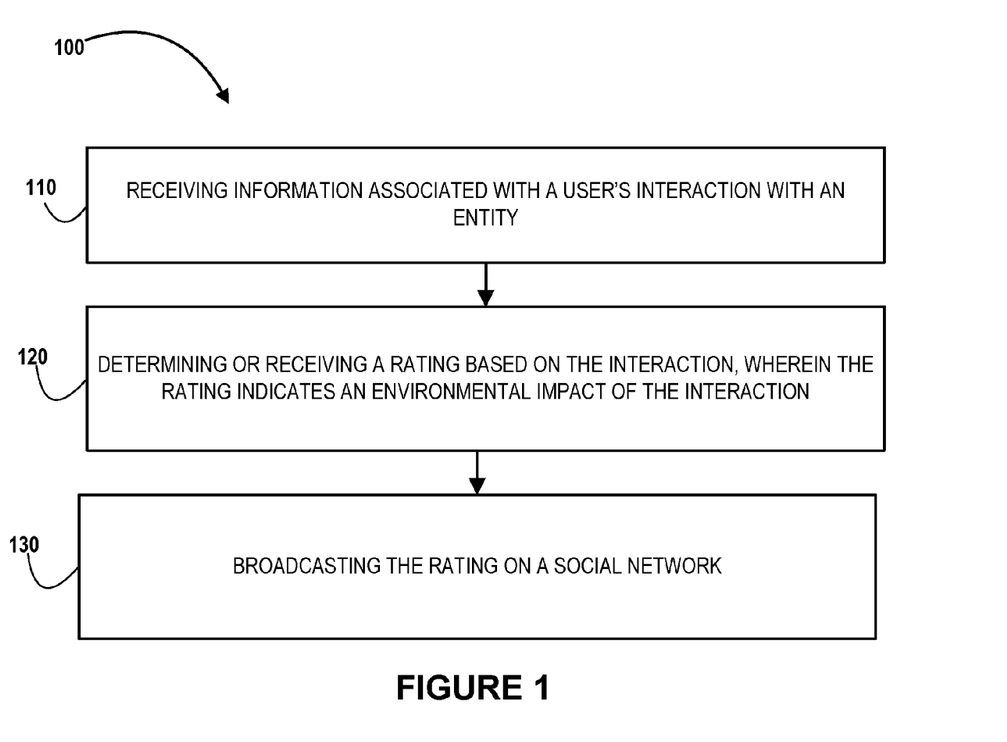
FIG. 1 is a flowchart illustrating a general process flow for social badging, in accordance with embodiments of the present invention.

Referring now to FIG. 1, a general process flow 100 is provided for social badging. At block 110, the method comprises receiving information associated with a user's interaction with an entity. At block 120, the method comprises determining (or receiving) a rating based on the interaction, wherein the rating indicates an environmental impact of the interaction. At block 130, the method comprises broadcasting the rating on a social network.

Figure 2:
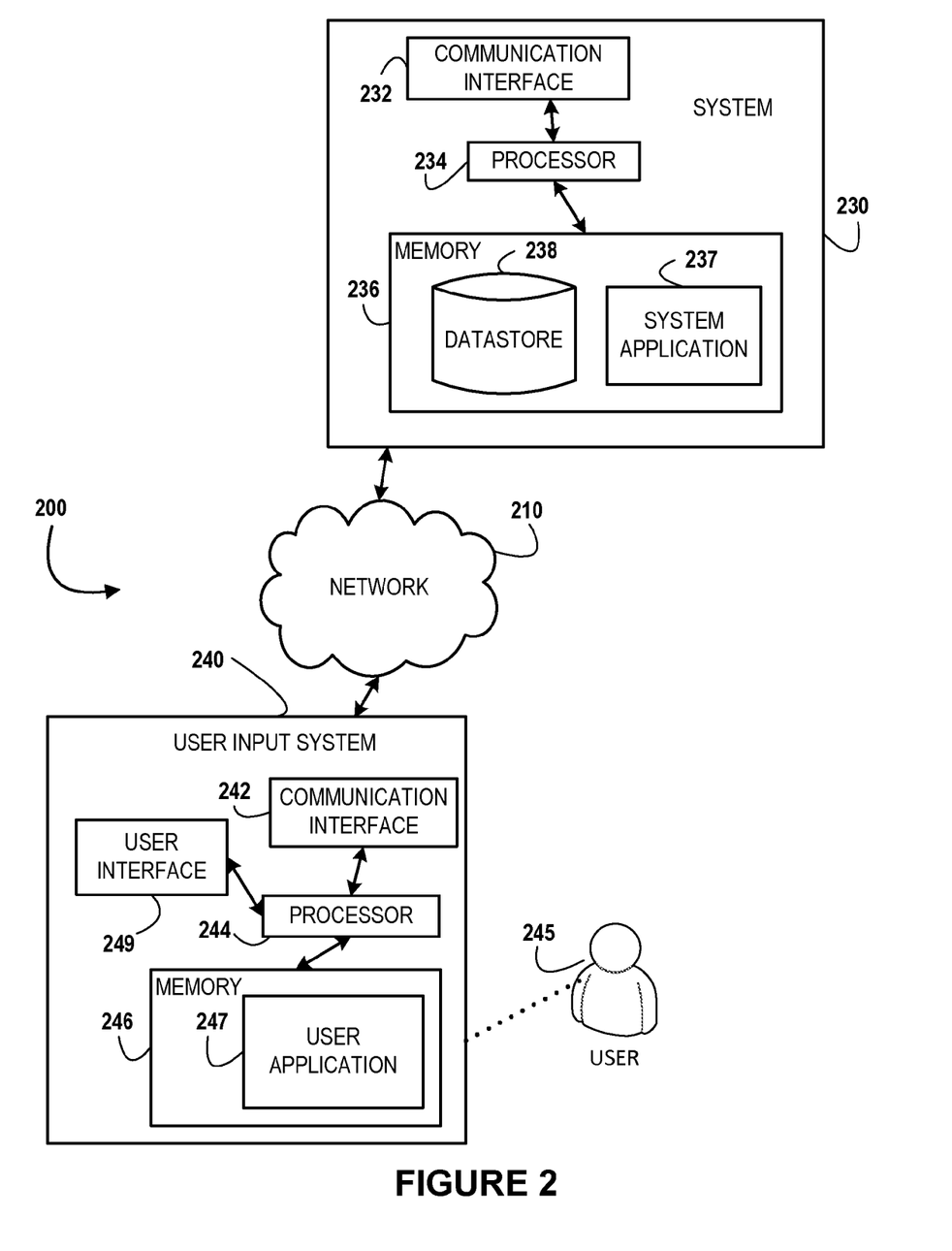
FIG. 2 is a block diagram illustrating technical components of a system for implementing the various processes described herein, in accordance with embodiments of the present invention.

Referring now to FIG. 2, FIG. 2 presents an exemplary block diagram of the system environment 200 for implementing any of the process flows described herein, in accordance with embodiments of the present invention. As illustrated, the system environment 200 includes a network 210, a system 230, and a user input system 240. Also shown in FIG. 2 is a user 245 of the user input system 240. The user input system 240 may be a mobile device (e.g., a portable mobile communication device). The user 245 may be a person (e.g., a social networking user) who uses the user input system 240 to execute a user application 247 (e.g., a social networking application). The system 230 may be the apparatus described herein that hosts or manages the social network (and the user's social networking account) described herein. The user application 247 and/or the system application 237 may incorporate one or more parts of the process flow 100 or any other function described herein. The user 245 may use the user input system 240 to perform one or functions as described herein.

As shown in FIG. 2, the system 230, and the user input system 240 are each operatively and selectively connected to the network 210, which may include one or more separate networks. In addition, the network 210 may include a local area network (LAN), a wide area network (WAN), and/or a global area network (GAN), such as the Internet. The network may also include a mobile telecommunication network. It will also be understood that the network 210 may be secure and/or unsecure and may also include wireless and/or wireline and/or optical interconnection technology.

The user input system 240 may include any computerized apparatus that can be configured to perform any one or more of the functions of the user input system 240 described and/or contemplated herein. For example, the user 245 may use the user input system 240 to transmit and/or receive information or commands to and from the system 230. In some embodiments, for example, the user input system 240 may include a personal computer system, a mobile computing device, a personal digital assistant, a mobile phone, a network device, and/or the like. As illustrated in FIG. 2, in accordance with some embodiments of the present invention, the user input system 240 includes a communication interface 242, a processor 244, a memory 246 having an user application 247 stored therein, and a user interface 249. In such embodiments, the communication interface 242 is operatively and selectively connected to the processor 244, which is operatively and selectively connected to the user interface 249 and the memory 246. In some embodiments, the user 245 may use the user application 247 to execute processes described with respect to the process flows described herein.

Each communication interface described herein, including the communication interface 242, generally includes hardware, and, in some instances, software, that enables the user input system 240, to transport, send, receive, and/or otherwise communicate information to and/or from the communication interface of one or more other systems on the network 210. For example, the communication interface 242 of the user input system 240 may include a wireless transceiver, modem, server, electrical connection, and/or other electronic device that operatively connects the user input system 240 to another system such as the system 230. The wireless transceiver may include a radio circuit to enable wireless transmission and reception of information.

Each processor described herein, including the processor 244, generally includes circuitry for implementing the audio, visual, and/or logic functions of the user input system 240. For example, the processor may include a digital signal processor device, a microprocessor device, and various analog-to-digital converters, digital-to-analog converters, and other support circuits. Control and signal processing functions of the system in which the processor resides may be allocated between these devices according to their respective capabilities. The processor may also include functionality to operate one or more software programs based at least partially on computer-executable program code portions thereof, which may be stored, for example, in a memory device, such as in the user application 247 of the memory 246 of the user input system 240.

Each memory device described herein, including the memory 246 for storing the user application 247 and other information, may include any computer-readable medium. For example, memory may include volatile memory, such as volatile random access memory (RAM) having a cache area for the temporary storage of information. Memory may also include non-volatile memory, which may be embedded and/or may be removable. The non-volatile memory may additionally or alternatively include an EEPROM, flash memory, and/or the like. The memory may store any one or more of pieces of information and data used by the system in which it resides to implement the functions of that system.

As shown in FIG. 2, the memory 246 includes the user application 247. In some embodiments, the user application 247 includes an interface for communicating with, navigating, controlling, configuring, and/or using the user input system 240. In some embodiments, the user application 247 includes computer-executable program code portions for instructing the processor 244 to perform one or more of the functions of the user application 247 described and/or contemplated herein. In some embodiments, the user application 247 may include and/or use one or more network and/or system communication protocols.

Also shown in FIG. 2 is the user interface 249. In some embodiments, the user interface 249 includes one or more output devices, such as a display and/or speaker, for presenting information to the user 245. In some embodiments, the user interface 249 includes one or more input devices, such as one or more buttons, keys, dials, levers, directional pads, joysticks, accelerometers, controllers, microphones, touchpads, touchscreens, haptic interfaces, microphones, scanners, motion detectors, cameras, and/or the like for receiving information from the user 245. In some embodiments, the user interface 249 includes the input and display devices of a mobile device, which are operable to receive and display information.

FIG. 2 also illustrates a system 230, in accordance with an embodiment of the present invention. The system 230 may include any computerized apparatus that can be configured to perform any one or more of the functions of the system 230 described and/or contemplated herein. In accordance with some embodiments, for example, the system 230 may include a computer network, an engine, a platform, a server, a database system, a front end system, a back end system, a personal computer system, and/or the like. Therefore, the system 230 may be a server, apparatus, or other computing device as described herein. In some embodiments, such as the one illustrated in FIG. 2, the system 230 includes a communication interface 232, a processor 234, and a memory 236, which includes a system application 237 and a datastore 238 stored therein. As shown, the communication interface 232 is operatively and selectively connected to the processor 234, which is operatively and selectively connected to the memory 236.

It will be understood that the system application 237 may be configured to implement any one or more portions of the various user interfaces and/or process flow described herein. The system application 237 may interact with the user application 247. It will also be understood that, in some embodiments, the memory includes other applications. It will also be understood that, in some embodiments, the system application 237 is configured to communicate with the datastore 238, the user input system 240, or the like.

It will be further understood that, in some embodiments, the system application 237 includes computer-executable program code portions for instructing the processor 234 to perform any one or more of the functions of the system application 237 described and/or contemplated herein. In some embodiments, the system application 237 may include and/or use one or more network and/or system communication protocols.

In addition to the system application 237, the memory 236 also includes the datastore 238. As used herein, the datastore 238 may be one or more distinct and/or remote datastores. In some embodiments, the datastore 238 is not located within the system and is instead located remotely from the system. In some embodiments, the datastore 238 stores information or data described herein.

It will be understood that the datastore 238 may include any one or more storage devices, including, but not limited to, datastores, databases, and/or any of the other storage devices typically associated with a computer system. It will also be understood that the datastore 238 may store information in any known way, such as, for example, by using one or more computer codes and/or languages, alphanumeric character strings, data sets, figures, tables, charts, links, documents, and/or the like. Further, in some embodiments, the datastore 238 may include information associated with one or more applications, such as, for example, the system application 237. It will also be understood that, in some embodiments, the datastore 238 provides a substantially real-time representation of the information stored therein, so that, for example, when the processor 234 accesses the datastore 238, the information stored therein is current or substantially current.

It will be understood that the embodiment of the system environment illustrated in FIG. 2 is exemplary and that other embodiments may vary. As another example, in some embodiments, the system 230 includes more, less, or different components. As another example, in some embodiments, some or all of the portions of the system environment 200 may be combined into a single portion. Likewise, in some embodiments, some or all of the portions of the system 230 may be separated into two or more distinct portions.

In addition, the various portions of the system environment 200 may be maintained for and/or by the same or separate parties. It will also be understood that the system 230 may include and/or implement any embodiment of the present invention described and/or contemplated herein. For example, in some embodiments, the system 230 is configured to implement any one or more of the embodiments of any process flow described herein. Additionally, the system 230 is configured to initiate presentation of any of the user interfaces described herein.

Figure 3:
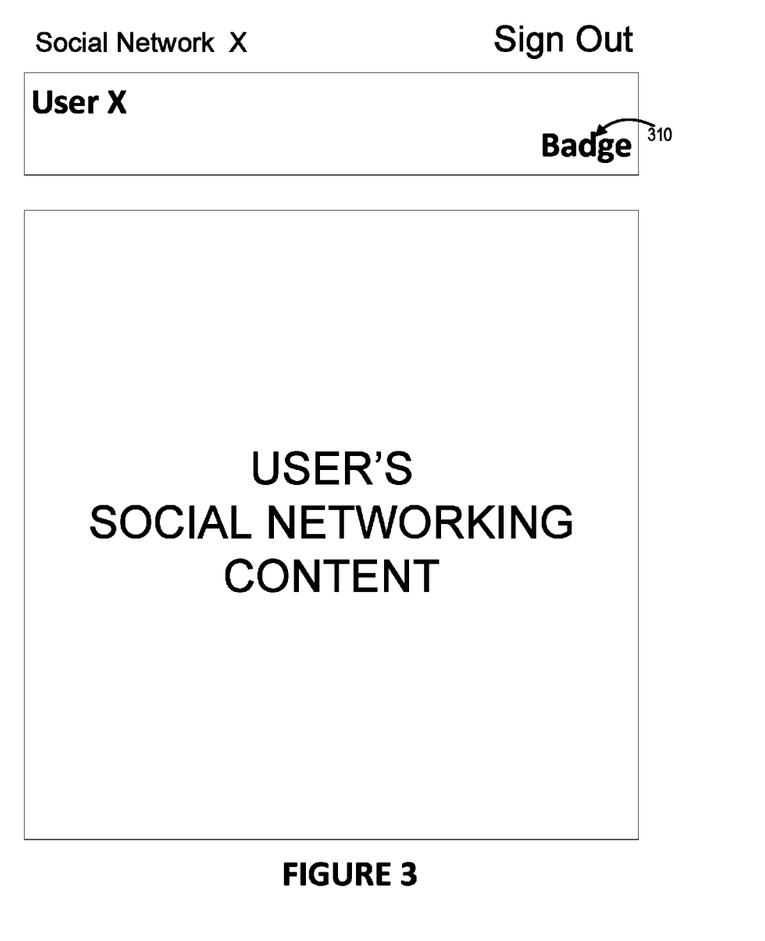
FIGS. 3 and 4 are exemplary user interfaces for social badging, in accordance with embodiments of the present invention.

Referring now to FIG. 3, FIG. 3 presents an exemplary user interface associated with a user's social networking account. When the user logs into the user's social networking account, the user may view the user's badge on the user's profile. The badge may be a pictorial representation (e.g., gold, silver, bronze, or the like) associated with the user's credits. Alternatively, the badge may comprise a number of pages suppressed, carbon emissions prevented, credits earned, or the like. When the user selects the badge 310, the user may be transported to another user interface associated with the user's social networking account.

Figure 4:
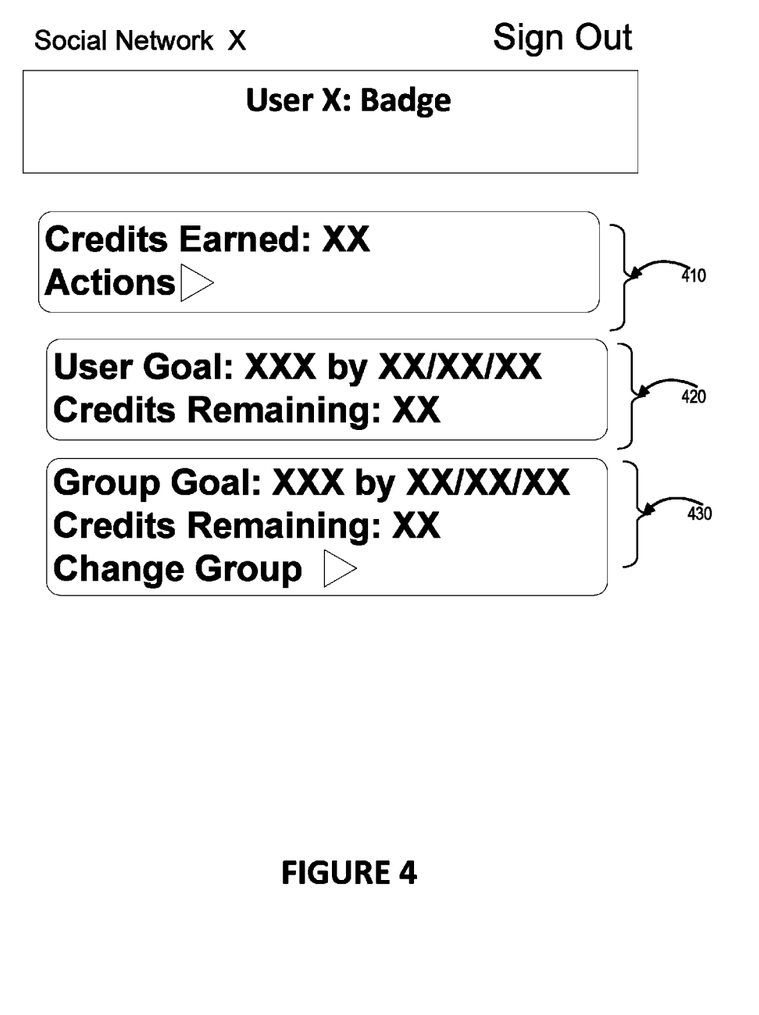

Referring now to FIG. 4, FIG. 4 presents an exemplary user interface associated with a user's social networking account. In this user interface, the user is presented with a tab 410 indicating the number of credits earned (e.g., for a period of time) and the actions associated with the credits. The user may select the button adjacent to the "Actions" label to view a list of actions, credits (or debits) associated with each action (e.g., going paperless), and other details associated with each action (e.g., entity associated with action, date of action, or the like). As described previously, the credits associated with an action may be determined based on the number of pages saved by the user. The user is also presented with a tab 420 for viewing the user's goal (e.g., the number of credits to earn by a certain date) and the number of credits remaining to achieve the goal. The user is also presented with a tab 430 for viewing a group's goal and the number of credits remaining for achieving the group's goal. The user may be part of the group and the user may pledge his or her credits to the group. The user may also select an option to change the group to which the user's credits are pledged or assigned. As used herein, a group may also be referred to as a network.

In accordance with embodiments of the invention, the term "module" with respect to a system may refer to a hardware component of the system, a software component of the system, or a component of the system that includes both hardware and software. As used herein, a module may include one or more modules, where each module may reside in separate pieces of hardware or software.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, microcode, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory or the like) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. An apparatus for social badging, the apparatus comprising:
  a memory;
  a processor; and
  a module stored in the memory, executable by the processor, and configured to:
    provide one or both an online banking application for installation on a mobile device or a link to an online banking platform;
    establish a communication link with the online banking application, wherein establishing further comprises creating a wireless data channel with the mobile device;
    electronically receive, via the wireless data channel, information associated with a user's interaction with an entity, wherein the interaction is performed via the online banking platform or the online banking application on a mobile device associated with the user, wherein the interaction comprises a user selection of an option to switch from paper-based notification to electronic notification;
    receive information associated with the interaction, wherein the information comprises a duration of time for which the user wishes to switch from paper-based notification to electronic notification;
    determine or receive a rating based on the interaction, wherein the rating indicates an environmental impact of the interaction;
    determine dynamically, a credit amount associated with the user's interaction based on at least the information associated with the interaction and the environmental impact of the interaction regarding switching from paper-based notification to electronic notification;
    initiate a presentation of a goal interface, wherein the goal interface comprises one or more goals associated with the user;
    electronically receive, using the goal interface, a user selection of a goal, wherein the goal is associated with a number of credits earned during a predetermined period of time;
    initiate a presentation of a network selection interface, wherein the network selection interface comprises one or more social network groups associated with the user;
    electronically receive, via the network selection interface, a user selection of a social network group associated with a social network from the one or more social network groups, wherein the social network group comprises a group credit amount; and
    broadcast the rating on the social network group, wherein broadcasting further comprises updating the user's progress towards the goal, wherein updating further comprises dynamically updating the credit amount and the group credit amount.

2. The apparatus of claim 1, wherein the interaction comprises a purchase transaction.

3. The apparatus of claim 1, wherein the interaction comprises at least one of an action, an inaction, a consumption, or an emission.

4. The apparatus of claim 1, wherein receiving the information further comprises receiving social networking identification information associated with the user.

5. The apparatus of claim 1, wherein the information associated with the user's interaction is received immediately after the interaction occurs or is received based on a predetermined schedule.

6. The apparatus of claim 1, wherein the information is received from the entity and wherein the rating is received from the entity, and wherein the entity obtains permission from the user to transmit the information.

7. The apparatus of claim 1, wherein the information is received from the user.

8. The apparatus of claim 1, wherein the rating comprises either a positive rating or a negative rating.

9. The apparatus of claim 1, wherein the rating is broadcasted to the user's connections on the social network.

10. The apparatus of claim 1, wherein the module is further configured to determine, based on the user's rating, a rating for a group on the social network.

11. The apparatus of claim 1, wherein the module is further configured to enable the user to determine a group to which the user's rating is pledged.

12. The apparatus of claim 1, wherein the module is further configured to update progress towards a user-defined goal based on the rating, wherein a representation of the progress is broadcasted on the social network.

13. The apparatus of claim 1, wherein the information is pulled from a transaction history associated with the user.

14. The apparatus of claim 1, wherein the entity comprises a financial institution.

15. The apparatus of claim 1, wherein the module enables a comparison of ratings associated with multiple users or groups on the social network.

16. The apparatus of claim 1, wherein the rating comprises a carbon credit score.

17. The apparatus of claim 1, wherein the module enables the user create a campaign to achieve a particular rating in a particular period.

18. A method for social badging, the method comprising:
  providing one or both an online banking application for installation on a mobile device or a link to an online banking platform;
  establishing, using a computing device processor, a communication link with the online banking application, wherein establishing further comprises creating a wireless data channel with the mobile device;
  electronically receiving, via the wireless data channel, information associated with a user's interaction with an entity, wherein the interaction is performed via the online banking platform or the online banking application on a mobile device associated with the user, wherein the interaction comprises a user selection of an option to switch from paper-based notification to electronic notification;
  receiving, using a computing device processor, information associated with the interaction, wherein the information comprises a duration of time for which the user wishes to switch from paper-based notification to electronic notification;
  determining or receiving, using a computing device processor, a rating based on the interaction, wherein the rating indicates an environmental impact of the interaction;

determining dynamically, using a computing device processor, a credit amount associated with the user's interaction based on at least the information associated with the interaction and the environmental impact of the interaction;

initiating, using a computing device processor, a presentation of a goal interface, wherein the goal interface comprises one or more goals associated with the user;

electronically receiving, using the goal interface, a user selection of a goal, wherein the goal is associated with a number of credits earned during a predetermined period of time;

initiating, using a computing device processor, a presentation of a network selection interface, wherein the network selection interface comprises one or more social network groups associated with the user;

electronically receiving, via the network selection interface, a user selection of a social network group associated with a social network from the one or more social network groups, wherein the social network group comprises a group credit amount; and broadcasting, using a computing device processor, the rating on the social network group, wherein broadcasting further comprises updating the user's progress towards the goal, wherein updating further comprises dynamically updating the credit amount and the group credit amount.

19. A computer program product for social badging, the computer program product comprising:

a non-transitory computer-readable medium comprising a set of codes for causing a computer to:

provide one or both an online banking application for installation on a mobile device or a link to an online banking platform;

establish a communication link with the online banking application, wherein establishing further comprises creating a wireless data channel with the mobile device;

electronically receive, via the wireless data channel, information associated with a user's interaction with an entity, wherein the interaction is performed via the online banking platform or the online banking application on a mobile device associated with the user, wherein the interaction comprises a user selection of an option to switch from paper-based notification to electronic notification;

receive information associated with the interaction, wherein the information comprises a duration of time for which the user wishes to switch from paper-based notification to electronic notification;

determine or receive a rating based on the interaction, wherein the rating indicates an environmental impact of the interaction;

determine dynamically, a credit amount associated with the user's interaction based on at least the information associated with the interaction and the environmental impact of the interaction regarding switching from paper-based notification to electronic notification;

initiate a presentation of a goal interface, wherein the goal interface comprises one or more goals associated with the user;

electronically receive, using the goal interface, a user selection of a goal, wherein the goal is associated with a number of credits earned during a predetermined period of time;

initiate a presentation of a network selection interface, wherein the network selection interface comprises one or more social network groups associated with the user;

electronically receive, via the network selection interface, a user selection of a social network group associated with a social network from the one or more social network groups, wherein the social network group comprises a group credit amount; and broadcast the rating on the social network group, wherein broadcasting further comprises updating the user's progress towards the goal, wherein updating further comprises dynamically updating the credit amount and the group credit amount.

* * * * *